United States Patent
Bae et al.

(10) Patent No.: US 9,991,814 B2
(45) Date of Patent: Jun. 5, 2018

(54) PRE-CHARGING CIRCUIT OF INVERTER

(71) Applicant: LSIS CO., LTD., Anyang-si, Gyeonggi-do (KR)

(72) Inventors: Tae Suk Bae, Cheonan-si (KR); Jae Moon Lee, Suwon-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days. days.

(21) Appl. No.: 14/539,798

(22) Filed: Nov. 12, 2014

(65) Prior Publication Data

US 2015/0138849 A1    May 21, 2015

(30) Foreign Application Priority Data

Nov. 19, 2013  (KR) .................. 10-2013-0140304

(51) Int. Cl.
| H02H 7/122 | (2006.01) |
| H02M 5/458 | (2006.01) |
| H02M 1/36 | (2007.01) |
| H02H 7/125 | (2006.01) |
| H02H 7/10 | (2006.01) |

(52) U.S. Cl.
CPC ............ *H02M 5/458* (2013.01); *H02M 1/36* (2013.01); *H02H 7/10* (2013.01); *H02H 7/125* (2013.01); *H02H 7/1222* (2013.01)

(58) Field of Classification Search
CPC .......... H02M 5/458; H02M 1/36; H02H 7/10; H02H 7/125; H02H 7/1222
USPC .............................. 363/37, 49, 53
See application file for complete search history.

(56) References Cited

U.S. PATENT DOCUMENTS

| 2013/0106328 A1* | 5/2013 | Kopiness ............ H02M 5/4585 363/49 |
| 2013/0234636 A1 | 9/2013 | Savatski et al. |
| 2014/0300298 A1* | 10/2014 | Liu ........................ H02M 5/453 318/380 |

FOREIGN PATENT DOCUMENTS

| CN | 1332903 | | 1/2002 |
| CN | 203014692 U | * | 6/2013 |
| CN | 103269166 | | 8/2013 |
| EP | 1168588 | | 1/2002 |
| JP | 05-223906 | | 9/1993 |
| JP | 07-009088 | | 2/1995 |
| JP | 07-9088 | | 2/1995 |
| JP | H07-009088 | * | 2/1995 |
| JP | 2000-139082 | | 5/2000 |
| JP | 2003-204681 | | 7/2003 |
| WO | 2013/099098 | | 7/2013 |

OTHER PUBLICATIONS

European Patent Office Application Serial No. 14193453.9, Search Report dated Jun. 3, 2015, 5 pages.

(Continued)

*Primary Examiner* — Jue Zhang
*Assistant Examiner* — Jye-June Lee
(74) *Attorney, Agent, or Firm* — K&L Gates LLP

(57) ABSTRACT

A pre-charging circuit of inverter is disclosed, the pre-charging circuit of inverter including a relay arranged between an output node of the rectifier and an input node of the DC-link capacitor, and a pre-charging resistor arranged between an output node of the rectifier and an input node of the inverter unit, whereby a degree of freedom for PCB design can be obtained.

3 Claims, 4 Drawing Sheets

(56) References Cited

OTHER PUBLICATIONS

Korean Intellectual Property Office Application Serial No. 10-2013-0140304, Office Action dated Mar. 11, 2015, 4 pages.
Japan Patent Office Application Serial No. 2014-233946, Office Action dated Dec. 8, 2015, 2 pages.
State Intellectual Property Office of the People's Republic of China Application No. 201410666133.2, Office Action dated Aug. 22, 2016, 6 pages.

* cited by examiner

PRE-CHARGING CIRCUIT OF INVERTER

CROSS-REFERENCE TO RELATED APPLICATIONS

Pursuant to 35 U.S.C. § 119(a), this application claims the benefit of earlier filing date and right of priority to Korean Patent Application No. 10-2013-0140304, filed on Nov. 19, 2013, the contents of which are all hereby incorporated by reference herein in its entirety.

BACKGROUND

Field of the Disclosure

The teachings in accordance with the exemplary embodiments of this present disclosure generally relate to a pre-charging circuit of inverter.

Description of Related Art

In general, an inverter is a power converting device configured to convert an inputted AC electric power to DC electric power having a predetermined frequency and voltage. FIG. 1 is a circuit diagram illustrating an inverter according to prior art.

Referring to FIG. 1, an inverter (200) converts a 3-phase AC power to a DC power through a rectifier (210) by receiving the 3-phase AC power from a 3-phase electric power source (100), stores the power in a DC-link capacitor (230), converts the DC power to an AC power having a predetermined frequency through an inverter unit (240) and supplies the AC power to a 3-phase motor (300).

The inverter (200) is a VVVF (Variable Voltage Variable Frequency) system, and controls the speed of the motor (300) by varying the voltage and frequency in response to a PWM (Pulse Width Modulation) output. The inverter system thus mentioned is applied with a pre-charging circuit (220).

The pre-charging circuit (220) serves to prevent an over-current generated by an inrush current inputted to the inverter (200) and also prevent dielectric breakdown of elements. A pre-charging resistor (221) of the pre-charging circuit (220) is operated only when an initial power of the inverter (200) is inputted, and prevents an unnecessary power loss of charging resistor by diverting a current flow to a relay (222) in a normal state.

FIG. 2 is a detailed circuit diagram illustrating the pre-charging circuit (220) and a DC-link capacitor (230).

Referring to FIG. 2, an input current is transmitted in the order of a node P1, a node P1 and DCP node through the rectifier (210). At this time, the node P1 and the node P2 are connected via a conductor.

In case of current path at the pre-charging circuit, a current is transmitted through the pre-charging resistor (221), and the current is transmitted through the relay (222) at the normal operation. That is, the current path is formed by the pre-charging resistor (221), the node DCP and the DC-link capacitor (230) at the pre-charging, and formed by the relay (222), the node DCP and the DC-link capacitor (230) at the normal operation. The current path at the normal operation performs an over-current protection, because a current flows from the node DCP to a node DCPI through a shunt resistor (231) when an over-current including arm shoot-through is generated.

However, because the pre-charging resistor (221) is connected between the nodes P2 and DCP in the above circuit, only one path exists where a current must pass the node DCP at the pre-charging. Thus, the current must pass the node DCP, and as a result, a considerable limited obstacle is generated when the pre-charging circuit is designed on a printed circuit board (PCB).

SUMMARY OF THE DISCLOSURE

The present disclosure is to provide a pre-charging circuit of inverter configured to provide a degree of freedom to a PCB design by proposing another path in addition to a single current path at a pre-charging circuit of an inverter.

In one general aspect of the present disclosure, there may be provided a pre-charging circuit of an inverter, the inverter including a rectifier, a DC-link capacitor, an inverter unit, and a shunt resistor between the DC-link capacitor and the inverter unit, the circuit comprising: a relay disposed between an output node of the rectifier and an input node of the DC-link capacitor; and a pre-charging resistor disposed between the output node of the rectifier and an input node of the inverter unit.

In some exemplary embodiment of the present invention, the pre-charging resistor may be operated at a pre-charging of the DC-link capacitor.

In some exemplary embodiment of the present invention, a current path during the pre-charging may be connected to the pre-charging resistor, the shunt resistor and the DC-link capacitor.

In some exemplary embodiment of the present invention, the relay may be operated during a normal state when a pre-charging is completed on the DC-link capacitor.

In some exemplary embodiment of the present invention, a current path during the normal state may be connected to the relay and the DC-link capacitor.

Advantageous Effect of the Disclosure

The exemplary embodiments of this present disclosure has an advantageous effect in that another current path different from a conventional current path is realized to obtain a degree of freedom in PCB design from an aspect of a designer that realizes a pre-charging circuit.

DETAILED DESCRIPTION OF THE DISCLOSURE

Various exemplary embodiments will be described more fully hereinafter with reference to the accompanying drawings, in which some exemplary embodiments are shown. The present inventive concept may, however, be embodied in many different forms and should not be construed as limited to the example embodiments set forth herein. Rather, the described aspect is intended to embrace all such alterations, modifications, and variations that fall within the scope and novel idea of the present disclosure.

Hereinafter, exemplary embodiments of the present disclosure will be described in detail with reference to the accompanying drawings.

Figure 3:
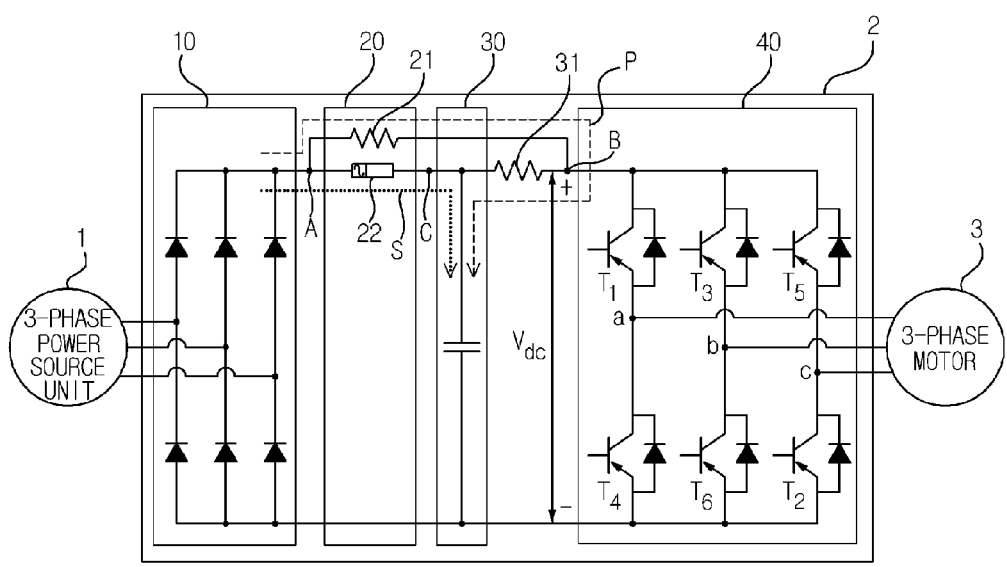
FIG. 3 is circuit diagram illustrating an inverter according to an exemplary embodiment of the present disclosure.

FIG. 3 is circuit diagram illustrating an inverter according to an exemplary embodiment of the present disclosure.

Referring to FIG. 3, an inverter (2) may be a device configured to convert an electric power of a 3-phase electric power source unit (1) to a power of predetermined frequency and voltage by receiving the power from the 3-phase electric power source (1) and provide the power to a 3-phase motor (3). The inverter (2) may include a rectifier (10), a pre-charging circuit (20), a DC-link capacitor (30) and an inverter unit (40). A shunt resistor (31) may be interposed in series between the DC-link capacitor (30) and the inverter unit (40) to protect an over-current inputted from the inverter unit (40).

The rectifier (10) can rectify an AC voltage inputted from the 3-phase power source unit (1) to a DC voltage, and the DC-link capacitor (30) can charge the voltage rectified by the rectifier (10). The voltage charged in the DC-link capacitor may be converted to an AC voltage having a predetermined voltage and frequency by the inverter unit (40) and provided to the 3-phase motor (2).

The pre-charging circuit according to the present disclosure may include a pre-charging resistor (21) and a relay (22). The pre-charging resistor (21) according to the present disclosure may be arranged between an output node (A) of the rectifier (10) and an input node (B) of the inverter unit (40), the configuration of which is distinguishable over a conventional pre-charging circuit that is arranged between an output node (A) of the rectifier (10) and an input node (C) of the DC-link capacitor (30).

Furthermore, the relay (22) may be arranged between an output node (A) of the rectifier (10) and an input node (C) of the DC-link capacitor (30).

Referring to FIG. 3 again, P may denote a current path during a pre-charging, and S may denote a current path during a normal state. Although a current having passed the pre-charging resistor (21) may be transmitted to the DC-link capacitor (30) during the pre-charging, the current may be transmitted to the DC-link capacitor (30) via the relay (22) during the normal state as in the conventional method.

Thus, the exemplary embodiment of this present disclosure is such that another current path different from a conventional current path during the pre-charging can be realized to provide a designer that realizes a pre-charging circuit by obtaining a degree of freedom in PCB design.

Figure 4:
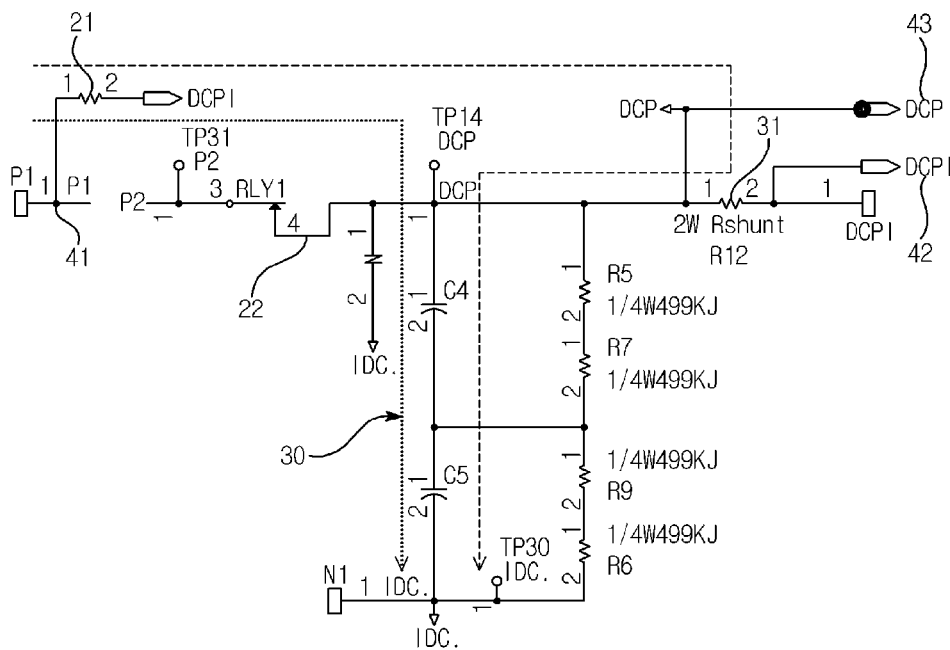
FIG. 4 is a detailed circuit diagram illustrating a pre-charging circuit and a DC-link capacitor according to an exemplary embodiment of the present disclosure.

FIG. 4 is a detailed circuit diagram illustrating a pre-charging circuit and a DC-link capacitor according to an exemplary embodiment of the present disclosure.

Figure 1:
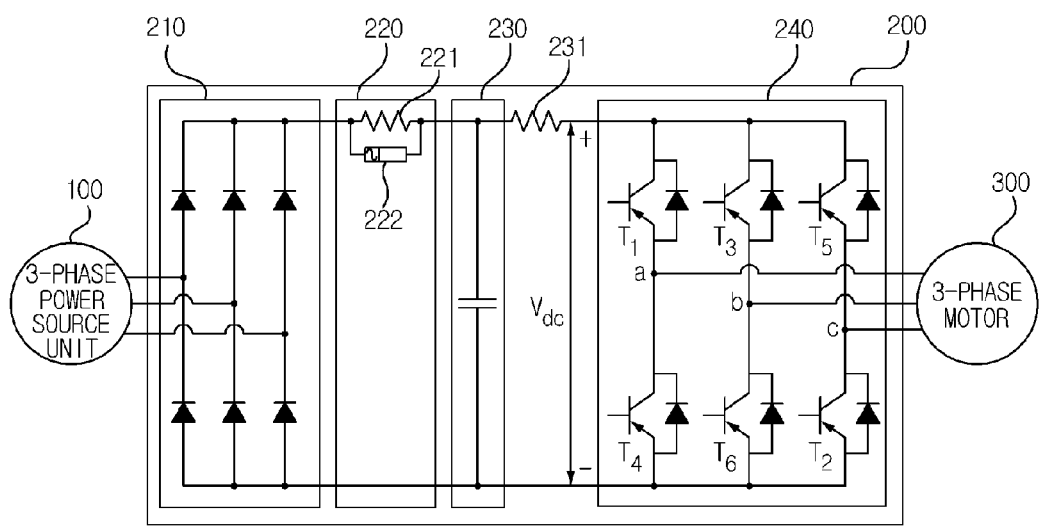
FIG. 1 is a circuit diagram illustrating an inverter according to prior art.
Figure 2:
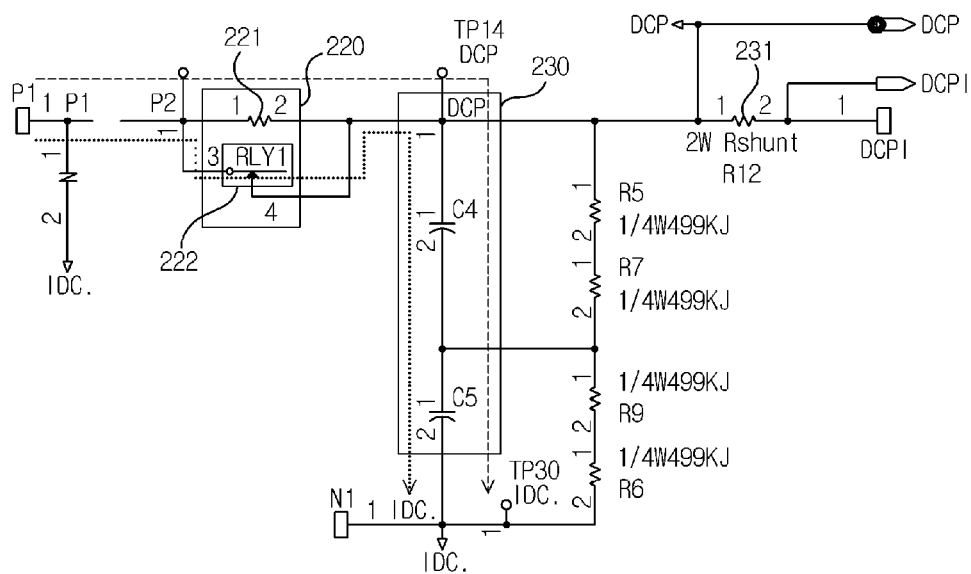
FIG. 2 is a detailed circuit diagram illustrating a pre-charging circuit and a DC-link capacitor of FIG. 1.

Referring to FIG. 4, the pre-charging resistor (21) connected between a node P2 and a node DCP in the conventional circuit of FIG. 2 may be arranged between a node P1 (41) and a node DCPI (42). A current during the pre-charging may be transmitted to a path of the node DCPI (42), the shunt resistor (31) and the DC-link capacitor (30), and a current during the normal state is transmitted to a path of the relay (22), a node DCP (43) and the DC-link capacitor (30).

Although a current path is added to the shunt resistor (31) after circuit change according to the present disclosure, there would be almost no influence by the pre-charging circuit because a shunt resistor is generally of mΩ unit. Thus, the exemplary embodiment of this present disclosure can obtain a degree of freedom in PCB design from an aspect of a designer that realizes a pre-charging circuit by realizing a path different from a current path according to prior art.

Although the present disclosure has been described in detail with reference to the foregoing embodiments and advantages, many alternatives, modifications, and variations will be apparent to those skilled in the art within the metes and bounds of the claims. Therefore, it should be understood that the above-described embodiments are not limited by any of the details of the foregoing description, unless otherwise specified, but rather should be construed broadly within the scope as defined in the appended claims.

What is claimed is:

1. A pre-charging circuit of an inverter, the inverter including a rectifier, a DC-link capacitor and an inverter unit, the pre-charging circuit comprising:
    a relay disposed between an output node of the rectifier and an input node of the DC-link capacitor;
    a shunt resistor comprising a first end of which is directly connected to both the input node of the DC-link capacitor and a first end of the relay, and a second end of which is directly connected to an input node of the inverter unit; and
    a pre-charging resistor comprising a first end of which is directly connected to both the output node of the rectifier and a second end of the relay, and a second end of which is directly connected to both the second end of the shunt resistor and the input node of the inverter unit,
    wherein the pre-charging resistor is operated at a pre-charging of the DC-link capacitor, and
    wherein a current path during the pre-charging is connected to the pre-charging resistor, the shunt resistor and the DC-link capacitor.

2. The pre-charging circuit of claim 1, wherein the relay is operated during a normal state when the pre-charging is completed.

3. The pre-charging circuit of claim 2, wherein a current path during the normal state is connected to the relay and the DC-link capacitor.

* * * * *